United States Patent
Tachino et al.

(10) Patent No.: US 7,306,691 B2
(45) Date of Patent: Dec. 11, 2007

(54) METHOD FOR FORMING OVERLAPPING SECTION

(75) Inventors: Yasuyuki Tachino, Sayama (JP); Shigeru Omori, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 10/980,091

(22) Filed: Nov. 3, 2004

(65) Prior Publication Data

US 2005/0098261 A1 May 12, 2005

(30) Foreign Application Priority Data

Nov. 7, 2003  (JP)  ............................. 2003-377697

(51) Int. Cl.
*B29C 65/00* (2006.01)
(52) U.S. Cl. .............. 156/272.6; 156/273.3; 156/272.2
(58) Field of Classification Search ............ 156/272.6, 156/273.3, 272.2; 427/535, 569; 219/121.36
See application file for complete search history.

(56) References Cited

U.S. PATENT DOCUMENTS

| | | | | |
|---|---|---|---|---|
| 4,834,219 A | * | 5/1989 | Inagaki et al. | 184/6.5 |
| 5,405,984 A | * | 4/1995 | Mathew et al. | 556/422 |
| 5,486,257 A | * | 1/1996 | Onishi | 156/305 |
| 6,080,495 A | * | 6/2000 | Wright | 428/623 |
| 6,476,342 B1 | * | 11/2002 | Gelbart | 219/121.59 |
| 2002/0018860 A1 | * | 2/2002 | Filippou et al. | 427/532 |
| 2003/0041659 A1 | * | 3/2003 | Marszalek et al. | 73/119 R |

FOREIGN PATENT DOCUMENTS

| | | |
|---|---|---|
| DE | 199 05 877 A1 | 8/2000 |
| JP | 06-192625 | 7/1994 |
| JP | 06192625 A * | 7/1994 |
| JP | 06 192625 A | 10/1994 |
| JP | 08024935 A * | 1/1996 |
| JP | 08 259900 A | 10/1996 |
| WO | WO 03/048067 A1 | 6/2003 |

OTHER PUBLICATIONS

Machine Translation of JP 06192625 A, Jul. 1994.*

* cited by examiner

*Primary Examiner*—Jeff H. Aftergut
*Assistant Examiner*—Daniel McNally
(74) *Attorney, Agent, or Firm*—Carrier, Blackman & Associates, P.C.; Joseph P. Carrier; William D. Blackman

(57) ABSTRACT

A method of forming an overlapping section involves radiating a plasma onto a first overlapping part of a first workpiece, over which oil is spread. Thereafter, silicone rubber, which functions as an adhesive and a sealant material, is applied onto the first overlapping part, and a second overlapping part of a second workpiece is overlapped on the first overlapping part. When the components are left standing still for a predetermined period of time, the overlapping section is formed, in which the first overlapping part and the second overlapping part are adhered to one another.

20 Claims, 7 Drawing Sheets

FIG. 7

| SAMPLE | WIDTH [mm] | LENGTH [mm] | MAXIMUM LOAD [N] | | ADHESIVE STRENGTH [MPa] | |
|---|---|---|---|---|---|---|
| | | | MEASURED VALUE | AVERAGE VALUE | MEASURED VALUE | AVERAGE VALUE |
| EXAMPLE 1 | 9.9 | 24.5 | 545 | 461 | 2.3 | 2.0 |
| | 9.7 | 24.7 | 417 | | 1.8 | |
| | 9.8 | 24.2 | 487 | | 2.1 | |
| | 9.7 | 24.4 | 464 | | 2.0 | |
| | 9.5 | 24.7 | 493 | | 2.1 | |
| | 9.5 | 24.5 | 453 | | 1.9 | |
| | 9.4 | 24.7 | 368 | | 1.6 | |
| COMPARATIVE EXAMPLE 1 | 9.5 | 24.5 | 541 | 470 | 2.3 | 2.1 |
| | 9.3 | 24.9 | 331 | | 1.4 | |
| | 9.2 | 24.6 | 413 | | 1.8 | |
| | 9.3 | 25.0 | 532 | | 2.3 | |
| | 9.1 | 24.8 | 459 | | 2.0 | |
| | 9.3 | 25.2 | 519 | | 2.2 | |
| | 9.1 | 24.6 | 498 | | 2.2 | |
| COMPARATIVE EXAMPLE 2 | 10.2 | 24.9 | 169 | 166 | 0.67 | 0.68 |
| | 9.7 | 24.7 | 177 | | 0.74 | |
| | 9.6 | 24.7 | 138 | | 0.58 | |
| | 9.9 | 24.9 | 156 | | 0.63 | |
| | 9.8 | 24.6 | 209 | | 0.87 | |
| | 9.9 | 24.9 | 161 | | 0.65 | |
| | 9.9 | 24.8 | 149 | | 0.61 | |
| COMPARATIVE EXAMPLE 3 | 9.5 | 24.5 | 143 | 168 | 0.61 | 0.71 |
| | 9.2 | 24.9 | 199 | | 0.88 | |
| | 9.4 | 24.6 | 161 | | 0.70 | |
| | 9.8 | 24.2 | 162 | | 0.69 | |
| | 9.6 | 24.5 | 199 | | 0.85 | |
| | 10.2 | 25.2 | 143 | | 0.56 | |
| | 9.6 | 24.5 | 167 | | 0.71 | |
| COMPARATIVE EXAMPLE 4 | 10.1 | 25.1 | 240 | 169 | 0.95 | 0.70 |
| | 10.0 | 25.1 | 190 | | 0.76 | |
| | 9.5 | 24.2 | 198 | | 0.87 | |
| | 9.8 | 24.5 | 166 | | 0.69 | |
| | 9.9 | 24.9 | 109 | | 0.44 | |
| | 9.2 | 24.3 | 060 | | 0.72 | |
| | 9.7 | 25.2 | 117 | | 0.48 | | ed, but it is intended that the present invention also includes any case in which the oil is spread while maintaining the thickness of the oil and widening the extent of adhesion.

METHOD FOR FORMING OVERLAPPING SECTION

BACKGROUND OF THE INVENTION

1. Field of the Invention

The present invention relates to a method for forming an overlapping section in which a first workpiece and a second workpiece are overlapped by the aid of an adhesive or sealant material.

2. Description of the Related Art

Conventionally, when constructing an internal combustion engine for an automobile, a packing made of rubber is interposed between metal members, for example, between an oil pan and a cylinder block. Such packing avoids leakage of oil and/or gas from spaces between the cylinder block and the oil pan.

However, since the packing is made of rubber, it is deteriorated as time elapses. Therefore, it is feared that leakage could occur after passage of a sufficiently long period of time. For this reason, a polymer sealant material, which tends not to suffer from time-dependent changes, and which makes it possible to avoid leakage over a long period of time, has begun to be adopted. Silicone rubber is one example of such a polymer sealant material.

The polymer sealant material is applied, for example, to a cylinder block, and in this state, an oil pan is overlapped thereon. Of course, it is also permissible that a polymer packing may be used and allowed to intervene between other overlapping sections.

Various oils, such as rust-preventive oils, cutting oils, and press working oils, tend to adhere to the respective constitutive members, such as the cylinder block and the oil pan, which make up the automobile internal combustion engine. If such members are overlapped with each other in a state in which the oil has adhered thereto as described above, the seal becomes incomplete, because such oil reduces the wettability of the polymer sealant material surface with respect to the overlapping section.

In order to avoid the inconvenience described above, oil adhering to parts to which the polymer sealant material is applied must be wiped off beforehand, or another type of degreasing treatment must be performed beforehand to the parts. However, in this case, if the wiping or degreasing treatments are performed non-uniformly, the seal is incomplete and ineffective at such non-uniform portions. Further, in the case of such wiping or degreasing treatments, it is necessary to perform complicated manual operations, resulting in an increase in cost.

Japanese Laid-Open Patent Publication No. 6-192625 suggests a procedure whereby a part, having oil adhered thereto, is irradiated with ultraviolet light, including light beams having predetermined wavelengths, before applying a polymer sealant material or an adhesive to the part. It is first described that irradiation using ultraviolet light may cut or break down the oil molecules to produce lower molecular weight molecules, which exhibit improved compatibility between the adhesive and the converted oil having lower molecular weight molecules, and thus wettability may be improved. Secondly, it is indicated that polar groups and/or reactive groups may be produced during break down of the oil molecules, and thus the oil itself may function as a coupling agent, enhancing the adherence of the adhesive and the sealant material. For the reasons described above, when the adhesive surface is reformed by ultraviolet radiation, adherence of the overlapping section in which the adhesive or the polymer sealant material intervenes, is performed favorably, and adhesive strength and sealing performance are improved (see Paragraph [0021] of such publication).

However, even when ultraviolet light is radiated as described above, it is still impossible to confirm, in all cases, sufficient adhesive strength and sealing performance at the overlapping section.

SUMMARY OF THE INVENTION

A general object of the present invention is to provide a method for forming an overlapping section, which makes it possible to form the overlapping section having sufficient adhesive strength and sealing performance.

According to an aspect of the present invention, there is provided a method for forming an overlapping section, comprising the steps of:

radiating a plasma onto a part of a first workpiece to which oil is adhered;

applying a polymer material to the part of the first workpiece that has been irradiated with the plasma, wherein the polymer material functions as an adhesive or a sealant material; and overlapping a second workpiece on the part of the first workpiece to which the polymer material has been applied, so that the polymer material is interposed between the first workpiece and the second workpiece.

In the present invention, the plasma is radiated onto the oil. Accordingly, bonding strength between the oil and the applied polymer material is improved. As a result, the oil and the polymer material are not exfoliated from each other. Further, in this situation, bonding strength is also improved between the oil and the workpiece. For the reasons described above, adhesive strength is increased remarkably at the overlapping section, formed by overlapping workpieces with the polymer material intervening therebetween. Excellent sealing performance is also obtained at the overlapping section in addition to having a large adhesive strength.

With respect to the reason why the bonding strength is improved between oil and the polymer material, it is assumed that carboxylic acid is produced in the oil as a result of being irradiated by the plasma.

The polymer material tends not to suffer from time-dependent changes. Therefore, the polymer material is excellent in adhesive strength and sealing performance over a long period of time. Therefore, leakage does not occur at the overlapping section.

In this procedure, it is preferable to perform a step in which the oil is spread by means of compressed gas before irradiating it with the plasma. Accordingly, by spreading the oil in this manner, its thickness is remarkably decreased. Therefore, even when the plasma irradiation time is short, it is possible to obtain an overlapping section having sufficient adhesive strength. In this manner, the overlapping section can be formed efficiently, while conserving energy.

As described above, in the present invention, the plasma is radiated after compressed gas has been jetted onto a part of the workpiece to which oil is adhered. Accordingly, bonding strength is improved between the oil and the workpiece, and in addition, bonding strength is improved between the polymer material and the oil. Therefore, it is possible to obtain an overlapping section, which is excellent in adhesive strength and sealing performance.

During such spreading, a portion of the oil may be removed by the compressed gas. In the present invention, the term "spread" refers not only to the case in which the extent of adhesion is widened while decreasing the thickness of the oil, but also the case in which a portion of the oil is actually removed by the compressed gas.

Preferred examples of the polymer material include silicone, which functions both as an adhesive and as a sealant material.

Any one of the first workpiece and the plasma-radiating mechanism may be fixed in position, with the plasma being radiated while moving the other of the first workpiece and the plasma-radiating mechanism. That is, the first workpiece may be fixed in position, whereby the plasma is radiated while moving the plasma-radiating mechanism. Alternatively, the plasma-radiating mechanism may be fixed in position, and the plasma may be radiated while moving the first workpiece. Accordingly, plasma can be radiated onto a plurality of workpieces in a short period of time. Therefore, the overlapping section is formed more efficiently.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 shows a table illustrating the size of each of workpieces used for forming the respective overlapping sections, according to Example 1 and Comparative Examples 1 to 4, loads obtained when the overlapping sections are separated, and the adhesive strengths thereof.

DESCRIPTION OF THE PREFERRED EMBODIMENTS

A method for forming an overlapping section according to the present invention will be explained in detail below with reference to the accompanying drawings, which exemplify preferred embodiments of the present invention.

Figure 1:
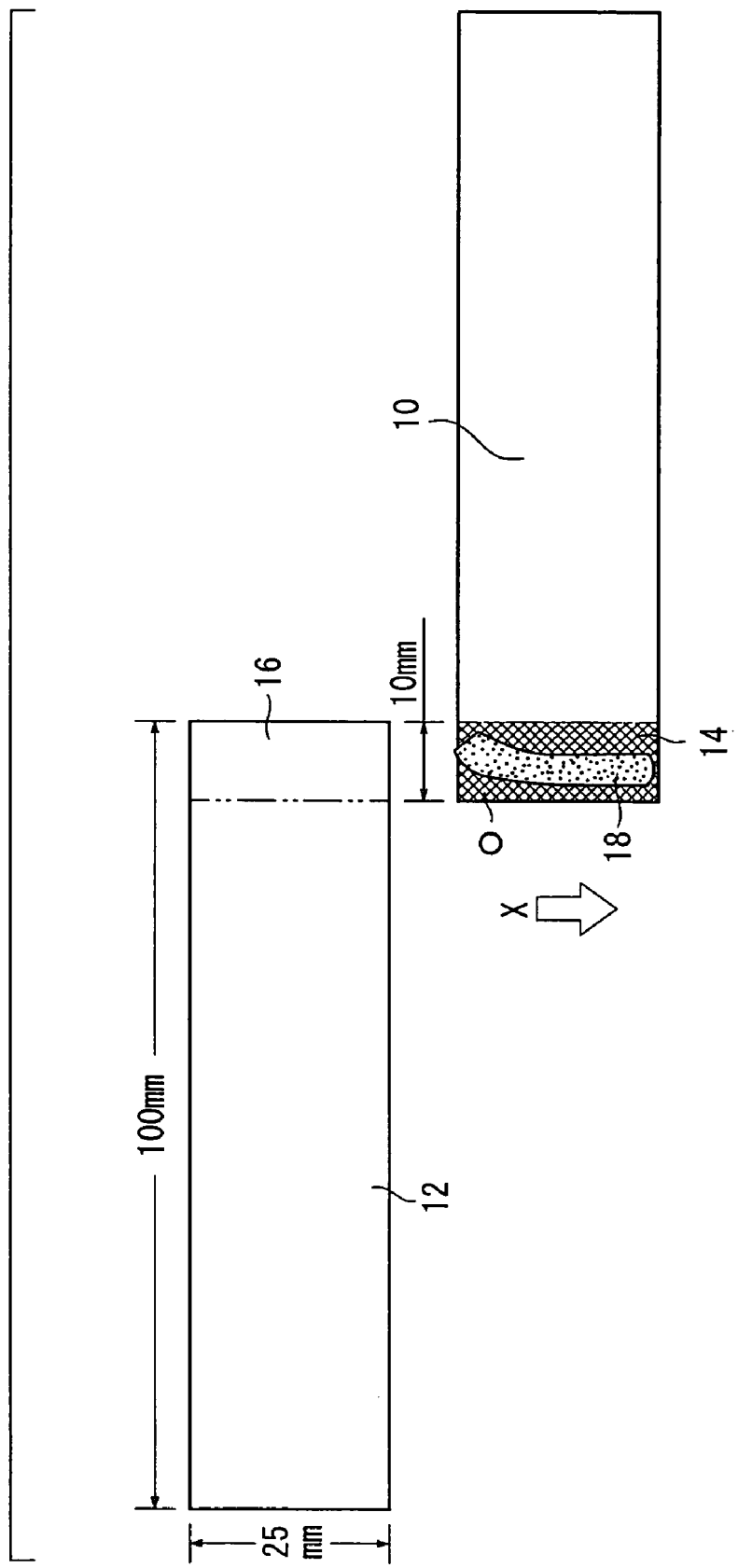
FIG. 1 shows a schematic plan view illustrating two entire workpieces, which are used when forming an overlapping section.

At first, an explanation will be made concerning an embodiment in which an overlapping section is provided, using a first workpiece 10 and a second workpiece 12 as test pieces, as shown in FIG. 1. In this embodiment, the first workpiece 10 and the second workpiece 12 are each rectangular test pieces composed of aluminum, having a length of 100 mm, a width of 25 mm, and a thickness of 1 mm. Oil is removed beforehand from the first workpiece 10 and the second workpiece 12 by wiping the workpieces with a waste cloth and performing a degreasing treatment using a degreasing agent.

Oil is then adhered to the first workpiece 10. Specifically, 0.025 cc of an oil O is dripped onto the first workpiece 10, and the oil O is spread to cover a range of 10 mm from one end of the first workpiece 10. In the following description, the range over which the oil is spread is referred to as a "first overlapping part" and is designated by reference numeral 14. On the other hand, a portion of the second workpiece 12, which is overlapped with the first overlapping part 14, is referred to as a "second overlapping part" and is designated by reference numeral 16.

Figure 2:
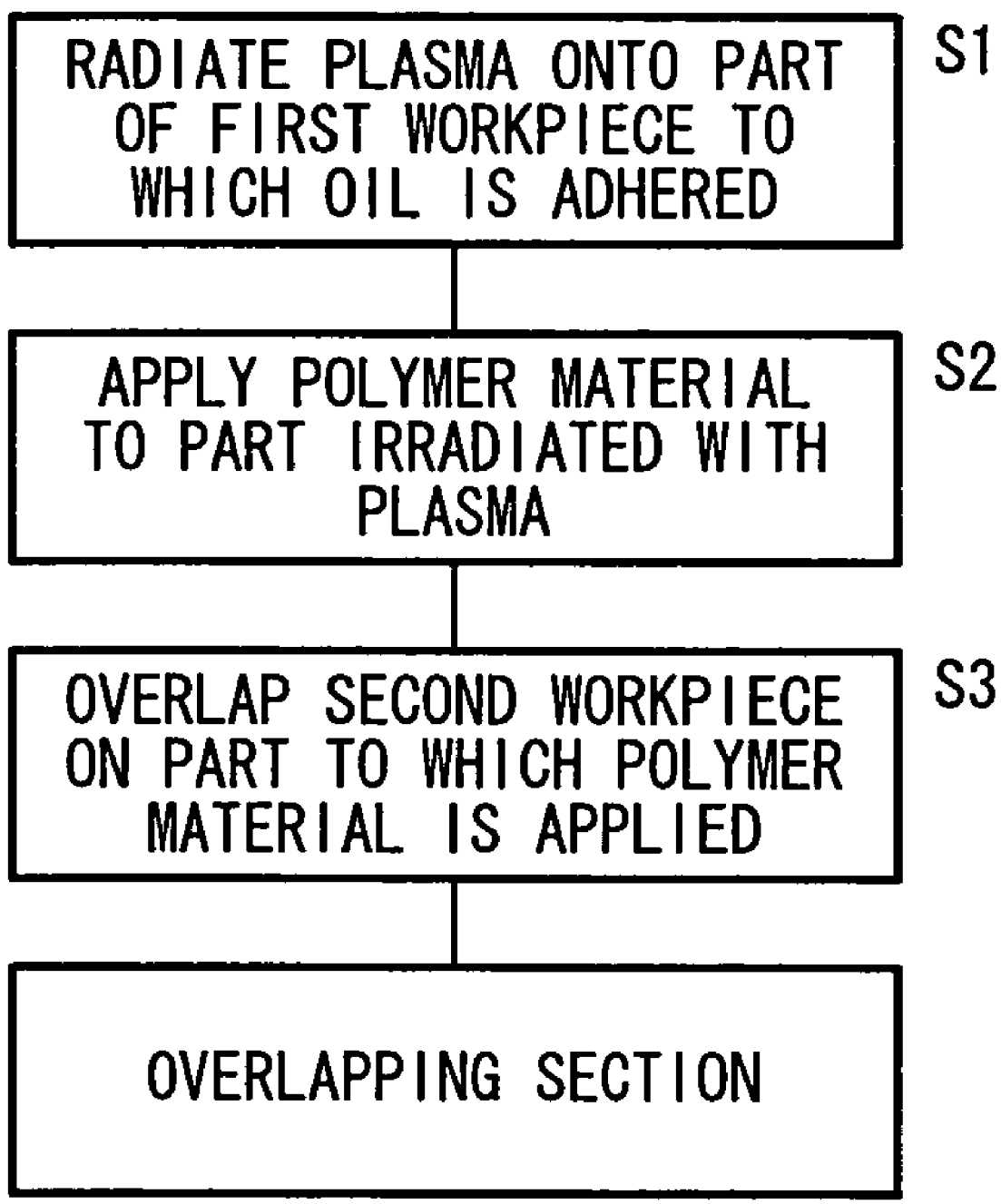
FIG. 2 shows a flow chart illustrating a method for forming the overlapping section according to an embodiment of the present invention.

A method for forming an overlapping section, using the first workpiece 10 and the second workpiece 12, is shown as a flow chart in FIG. 2. The forming method comprises a first step S1 of radiating a plasma onto the first workpiece 10; a second step S2 of applying silicone rubber 18 (see FIG. 1) as a polymer material to the first workpiece 10, wherein the silicone rubber 18 functions dually as an adhesive and a sealant material; and a third step S3 of overlapping the second workpiece 12 on the part of the first workpiece 10 to which the silicone rubber 18 has been applied.

Figure 3:
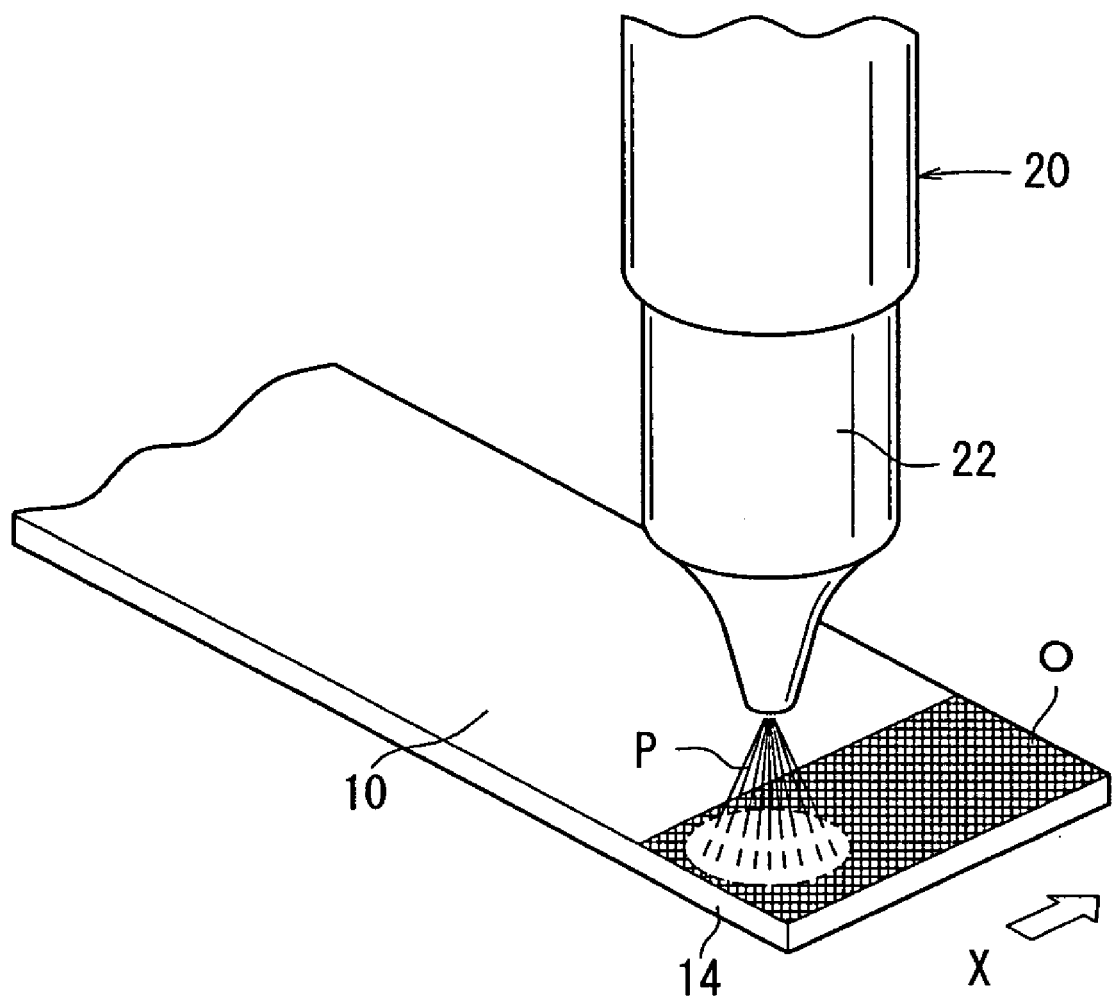
FIG. 3 shows a schematic perspective view illustrating major parts and depicting a state in which a plasma is radiated onto a first overlapping portion of a first workpiece.

In the first step S1, the first overlapping part 14 is treated as follows. As shown in FIG. 3, a plasma P is radiated onto the entire first overlapping part 14 using a plasma-radiating apparatus 20, while moving the first workpiece 10 in the X direction shown in FIGS. 1 and 3. The movement speed during this process may be 30 mm/second when the distance between the first workpiece 10 and the plasma gun 22 is 5 to 10 mm. When the radiation width of the plasma P is less than 10 mm, the following procedure may be used. That is, after initial irradiation, the first workpiece 10 is returned to its original position. After that, the first workpiece 10 is moved slightly to a position so that the plasma P can be radiated onto the non-irradiated portion of the first overlapping part 14, and the first workpiece 10 is moved again in the X direction shown in FIGS. 1 and 3.

Subsequently, in the second step S2, as shown in FIG. 1, a silicone rubber 18 such as Three Bond 1216E (trade name, produced by Sumitomo 3M Ltd.) is applied onto the first overlapping part 14. The silicone rubber 18 may be applied, for example, in a columnar form having a diameter of 8 mm over a range of 25 mm in the X direction.

Figure 4:
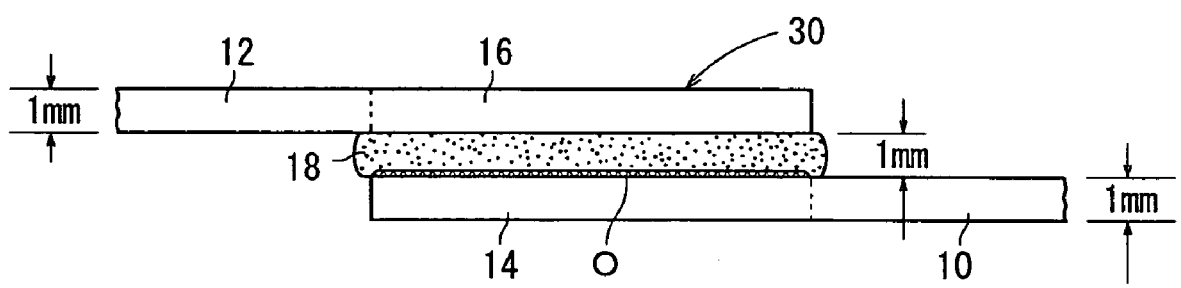
FIG. 4 shows a schematic front view illustrating an overlapping section, in which silicone rubber is interposed between a first overlapping part and a second overlapping part thereof.

In the third step S3, the second overlapping part 16 is overlapped on the first overlapping part 14 to which the silicone rubber 18 has been applied. Both parts 14 and 16 are caused to make contact with each other under an applied pressure using an unillustrated jig. Accordingly, as shown in FIG. 4, an overlapping section 30 is formed, wherein the silicone rubber 18 is interposed between the first overlapping part 14 and the second overlapping part 16. During this process, the silicone rubber 18 is deformed under pressure between the first overlapping part 14 and the second overlapping part 16 until acquiring a thickness of about 1 mm. In FIG. 4, for sake of convenience, the first overlapping part 14 and the second overlapping part 16 are depicted with phantom lines.

After the components have been left to stand for 7 days at room temperature, the adhesion under pressure is completed, and an adhesion test piece is obtained. The adhesion test piece comprises an overlapping section 30, in which the first overlapping part 14 and the second overlapping part 16 are adhered or joined to one another as a result of the adhesive properties of the silicone rubber 18, and moreover, the space between both parts 14 and 16 is sealed by the silicone rubber 18.

A tensile shear test was performed for the test piece using an IMADA Force Gauge (DSP-100), in accordance with Japan Industrial Standard JIS K 6850, as the standard test method for testing tensile shear adhesion strength of the adhesive. The following results were obtained.

Figure 5:
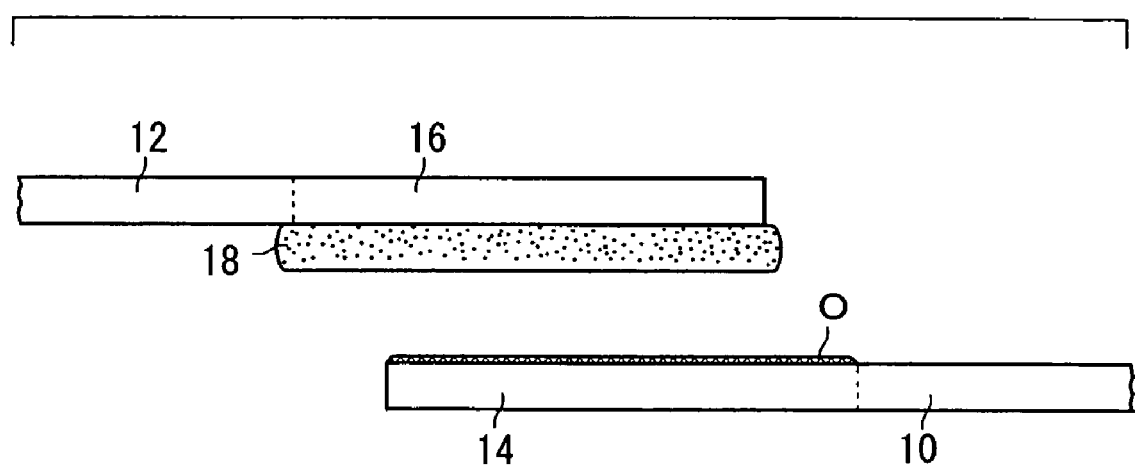
FIG. 5 shows a schematic front view illustrating a state in which an overlapping section, formed without plasma irradiation, is separated.

When plasma radiation is not performed yet oil O is applied to the first workpiece, and the first workpiece 10 and the second workpiece 12 are pulled in directions to separate from each other, respectively, then the oil O and the silicone rubber 18 applied to the overlapping section 30 are exfoliated and separated even when a relatively small tensile force is applied, as shown in FIG. 5. In contrast, when the adhesion test piece subjected to the plasma radiation was pulled, the overlapping section 30 is finally separated only as a result of destruction of the silicone rubber 18. Therefore, the adhesive strength of the overlapping section 30 is remarkably increased, as compared to the case when the workpiece is not irradiated with the plasma. When the overlapping section 30 has a large adhesive strength, as described above, sealing performance is excellent as well.

The adhesive strength of the overlapping section 30 after being irradiated by the plasma is substantially equivalent to that of an adhesion test piece obtained without irradiating the workpiece with plasma but also without reapplying oil O to the workpiece after performing a degreasing treatment. According to this result, it is appreciated that a more convenient operation, namely, irradiation by a plasma P, can be performed, for obtaining an overlapping section 30 which exhibits satisfactory adhesive strength. A complicated operation, in which oil O is removed by means of a manual operation, need not be performed.

As described above, even when an overlapping section 30 is formed using workpieces on which oil O is adhered on the surfaces thereof, the adhesive strength of the overlapping section 30 remains excellent by irradiating the workpieces with the plasma before overlapping the workpieces with each other.

The reason the adhesive strength of the overlapping section 30 is improved is postulated to be as follows. When irradiated with the plasma P, the functional group of the oil O adhered to the first overlapping part 14 becomes oxidized, and the functional group is changed into a carboxylic acid group. Further, a hydrogen bond is formed by the carboxylic acid group and $Al(OH)_3$ which exists on the surface of aluminum, which is used as the material for the first workpiece 10. Accordingly, it becomes highly difficult for the oil O to be exfoliated from the first overlapping part 14.

On the other hand, the carboxylic acid group, which faces the silicone rubber 18, reacts with a ketoxime group bonded to the terminal end of the silicone rubber 18. Accordingly, the oil O and the silicone rubber 18 are also tightly bonded to one another. As a result, it also becomes highly difficult for the oil O to be exfoliated from the silicone rubber 18.

As described above, the following assumption may be affirmed. That is, the oil O is not exfoliated from either the first overlapping part 14 or the silicone rubber 18, because a carboxylic acid group is produced in the oil O due to plasma irradiation. As a result, adhesive strength is improved.

When an automobile internal combustion engine is manufactured, various operations, such as assembly operations, are performed while transporting respective constitutive members. When an overlapping section 30, as described above, is formed on a production line, the foregoing operations may be performed while moving the constitutive members at a predetermined movement speed.

In this process, in order to reduce the amount of oil O adhered to the workpiece, it is preferable to blow air over the workpiece before irradiating the workpiece with the plasma P. Accordingly, even when the movement speed is large, and the radiation time of the plasma P is short, sufficient adhesive strength and sealing performance for the overlapping section 30 can be secured.

Figure 6:
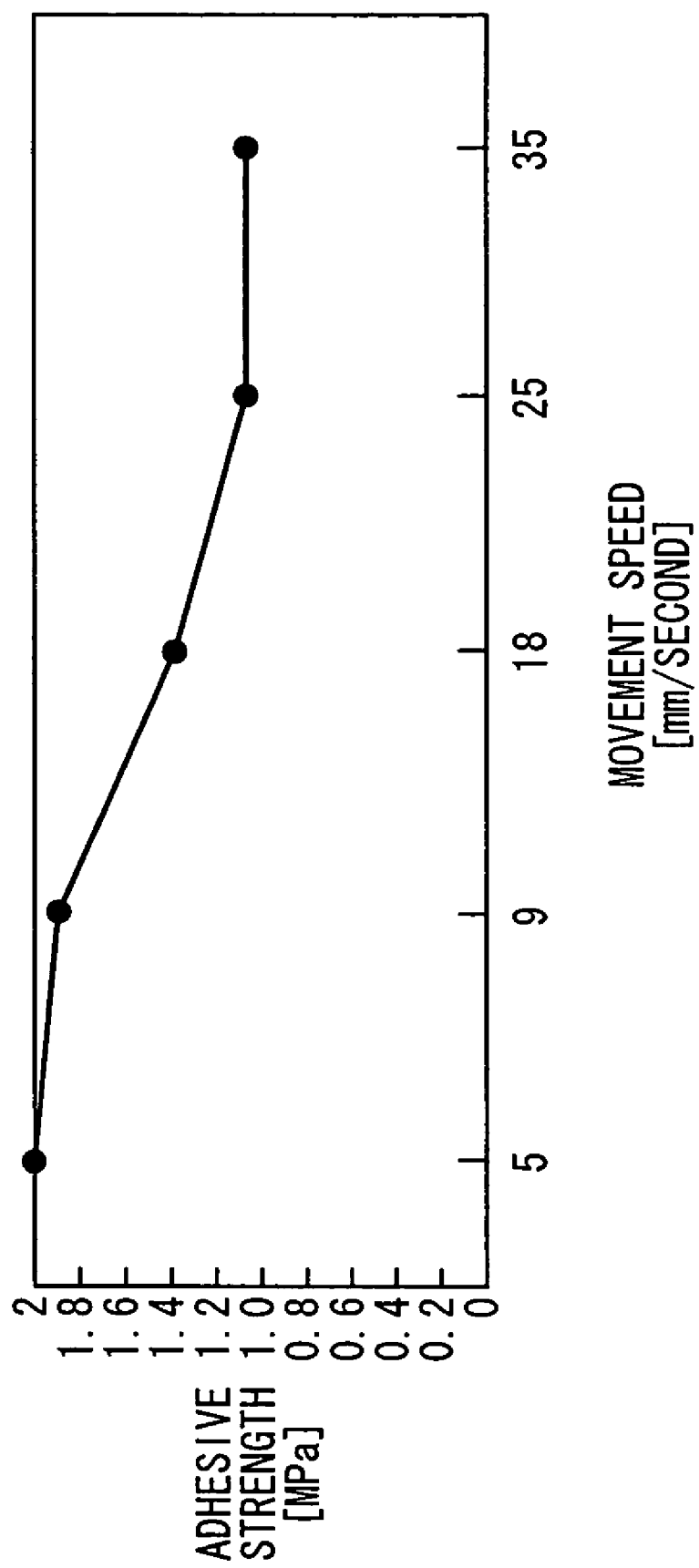
FIG. 6 shows a graph illustrating the relationship between adhesive strength of the overlapping section and movement speed of the workpiece while air is blown thereon, and while plasma irradiation is performed after blowing of air.

For example, the air jetting pressure and the air jetting time may be set to 0.05 MPa and 1 second respectively. With respect to the relationship between adhesive strength and movement speed of the workpieces, in relation to overlapping sections 30 formed by irradiation with the plasma P while moving the workpieces at a variety of movement speeds, the relationship shown in FIG. 6 was obtained when air was blown under the conditions described above. The amount of the oil O adhered at the overlapping section was within a range of 0.025 to 0.075 cc. According to FIG. 6, it is clear that adhesive strength is increased by sufficiently blowing air over the workpieces as described above.

In the production line, a portion of the plasma-radiating apparatus 20 may interfere with the transport line equipment. Therefore, it is sometimes difficult to arrange the plasma gun 22 in the vicinity of the workpieces. In other words, the plasma gun 22 may be separated far apart from the workpieces in some cases. In such a situation, even when the length of the forward end of the plasma gun 22 is simply lengthened, to allow the plasma P to contact the workpiece, the adhesive strength of the overlapping section 30 still tends to be lowered, probably for the following reason. That is, it is postulated that the amount of active oxygen in the plasma P is decreased to a large extent before the plasma P reaches and contacts the workpiece.

In order to ensure sufficient adhesive strength at the overlapping section 30, even when the length of the forward end of the plasma gun 22 must be increased, sufficient adhesive strength can still be achieved if the applied electric power to the plasma gun 22 is increased. For example, an initial assumption is made that an adhesive strength of 1.6 MPa is obtained at an applied electric power of 80 W, when using a plasma gun 22 having a diameter of 3 mm and a length of 40 mm. Based on this assumption, in order to obtain an equivalent adhesive strength when the length of the plasma gun 22 is 60 mm, it is sufficient to use an applied electric power of 130 W. Further, in order to obtain an equivalent adhesive strength when the length of the plasma gun 22 is 75 mm, it is sufficient to use an applied electric power of 170 W.

In the embodiment described above, both the first workpiece and the second workpiece are made of aluminum. However, there is no special restriction thereto, and the workpiece may be made of a different metal.

The polymer material should be a substance that functions as any one of a sealant material and an adhesive. The polymer material is not necessarily limited to silicone. Rather, it is sufficient that the polymer material be a substance that functions as any one of a sealant material and an adhesive.

In the embodiment described above, the plasma P is radiated while moving the first workpiece 10. However, the first workpiece 10 may be fixed in position, while the plasma gun 22 is moved. Further, it goes without saying that a plurality of plasma guns 22 may be arranged corresponding to the length and width of the overlapping section 30.

EXPERIMENTAL EXAMPLE

Test pieces made of aluminum were cut out, each of which had a thickness of 1 mm and lengths and widths as shown in FIG. 7. Test pieces, having the same dimensions as test pieces used in the comparative examples, were designated as first workpieces. Oil was removed from each of the first workpieces by means of wiping with a waste cloth and performing a degreasing treatment with a degreasing agent. After that, 0.025 cc of oil was reapplied by dripping onto the first workpieces, and the oil was spread over a first overlapping part of the first workpieces.

Plasma was radiated onto the first overlapping part while the movement speed of the first workpieces was 2 mm/second. Three Bond 1216E (silicone rubber) was applied in a columnar form having a diameter of 8 mm to the first overlapping part. A second overlapping part of second workpieces was overlapped on the first overlapping part of each of the first workpieces, respectively, and then the workpieces were left to stand for 7 days to create adhered or joined overlapping sections for each of the test pieces, which were designated as Example 1 in FIG. 7.

An overlapping section was formed in the same manner as in Example 1, except that after oil was removed by wiping with a waste cloth and performing a degreasing treatment with the degreasing agent, reapplication of oil and plasma radiation were not performed. An obtained product was designated as Comparative Example 1.

An overlapping section was formed in the same manner as in Example 1, except only that plasma radiation was not performed. An obtained product was designated as Comparative Example 2.

An overlapping section was formed in the same manner as in Example 1 except that, in place of plasma radiation, irradiation using ultraviolet light was performed using a mercury lamp light source. An obtained product was designated as Comparative Example 3.

An overlapping section was formed in the same manner as in Example 1 except that, in place of plasma radiation, irradiation using ultraviolet light was performed using a metal halide lamp light source. An obtained product was designated as Comparative Example 4.

A universal material testing machine, Model 15565 manufactured by Instron, was used for testing the overlapping sections produced according to Example 1 and Comparative Examples 1 to 4 described above. The first workpiece and the second workpiece were pulled apart, in directions to separate from each other, in accordance with a cross-head movement amount method. Adhesive strength was calculated from the area of the overlapping section and the load exerted when the first and second workpieces separated from each other. The test was performed for the seven test pieces, for each of Example 1 and Comparative Examples 1 to 4, to determine average values for load and adhesive strength. The combined results are shown in FIG. 7. According to FIG. 7, the following facts were clarified. Specifically, the adhesive strength of the overlapping section in Example 1 is substantially equivalent to the adhesive strength of the overlapping section formed in a state in which no oil exists. Further, adhesive strength improved remarkably compared to the case in which plasma radiation was not performed or the cases in which irradiation using ultraviolet light was performed.

In the method for forming an overlapping section, according to the present invention, an overlapping section, which is satisfactory in terms of sealing performance and adhesive strength, is obtained using a polymer material that tends not to suffer from time-dependent changes. Therefore, leakage is prevented from occurring over a long period of time, in a mechanism such as an automobile internal combustion engine, constructed by combining a plurality of members.

While the invention has been particularly shown and described with reference to preferred embodiments, it will be understood that variations and modifications can be effected thereto by those skilled in the art without departing from the spirit and scope of the invention as defined by appended claims.

What is claimed is:

1. A method for forming an overlapping section, comprising the steps of:
   radiating a plasma onto a part of a first workpiece of a metal to which oil is adhered;
   applying a polymer material to said part of said first workpiece where said oil irradiated with said plasma exists, wherein said polymer material functions as an adhesive or a sealant material; and
   overlapping a second workpiece of a metal on said part of said first workpiece to which said polymer material has been applied, so that said polymer material is interposed between said first workpiece and said second workpiece.

2. The method for forming an overlapping section according to claim 1, wherein one of said first workpiece and a plasma-radiating mechanism is fixed in position, and said plasma is irradiated while moving the other of said first workpiece and said plasma-radiating mechanism.

3. The method for forming an overlapping section according to claim 2, wherein a distance between said first workpiece and a plasma gun of said plasma-radiating mechanism is 5 to 10 mm, and a movement speed of said first workpiece or said plasma-radiating mechanism is within 30 mm/second.

4. The method for forming an overlapping section according to claim 3, wherein said plasma gun of said plasma-radiating mechanism has a diameter of 3 mm and a length of 40 mm, and an applied electric power is 80 W.

5. The method for forming an overlapping section according to claim 3, wherein said plasma gun of said plasma-radiating mechanism has a diameter of 3 mm and a length of 60 mm, and an applied electric power is 130 W.

6. The method for forming an overlapping section according to claim 3, wherein said plasma gun of said plasma-radiating mechanism has a diameter of 3 mm and a length of 75 mm, and an applied electric power is 170 W.

7. The method for forming an overlapping section according to claim 1, wherein said polymer material is silicone.

8. The method for forming an overlapping section according to claim 3, wherein a functional group of said oil is oxidized into a carboxylic acid group by said plasma radiation, and said carboxylic acid group reacts with a ketoxime group existing in said silicone.

9. The method for forming an overlapping section according to claim 8, wherein each of said first workpiece and said second workpiece is composed of aluminum.

10. The method for forming an overlapping section according to claim 9, wherein a hydrogen bond is produced between said carboxylic acid group and aluminum hydroxide of said workpiece.

11. The method for forming an overlapping section according to claim 1, wherein said oil is spread by means of compressed gas before irradiating it with said plasma.

12. The method for forming an overlapping section according to claim 11, wherein an amount of said oil is 0.025 to 0.075 cc, a jetting pressure of said compressed gas is 0.05 MPa, and a jetting time is 1 second.

13. The method for forming an overlapping section according to claim 1, wherein each of said first workpiece and said second workpiece is composed of aluminum.

14. The method for forming an overlapping section according to claim 13, wherein a functional group of said oil is oxidized into said carboxylic acid group by said plasma radiation, and a hydrogen bond is produced between said carboxylic acid group and aluminum hydroxide of said workpiece.

15. The method for forming an overlapping section according to claim 1, wherein the step of applying the polymer material to said part of said first workpiece includes applying the polymer material in columnar form.

16. A method for forming an overlapping section for an internal combustion engine, comprising the steps of:

radiating a plasma onto a part of a first workpiece formed of a metal to which oil is adhered;

applying a polymer material to said part of said first workpiece where said oil irradiated with said plasma exists, wherein said polymer material functions as an adhesive or a sealant material; and overlapping a second workpiece formed of a metal on said part of said first workpiece to which said polymer material has been applied, so that said polymer material is interposed between said first workpiece and said second workpiece;

wherein each of said first workpiece and said second workpiece are portions of the internal combustion engine.

17. The method for forming an overlapping section according to claim 16, wherein the step of applying the polymer material to said part of said first workpiece includes applying the polymer material in columnar form.

18. The method for forming an overlapping section according to claim 17, wherein a diameter of said columnar form is approximately 8 mm.

19. The method for forming an overlapping section according to claim 16, wherein said metal of the first and second workpieces is aluminum and said polymer material is silicone.

20. The method for forming an overlapping section according to claim 16, wherein one of said first workpiece and a plasma-radiating mechanism is fixed in position, and said plasma is irradiated while moving the other of said first workpiece and said plasma-radiating mechanism.

* * * * *